(No Model.) 2 Sheets—Sheet 1.

G. KRELL.
APPARATUS FOR CONCENTRATING AND DISTILLING SULFURIC ACID.

No. 549,138. Patented Nov. 5, 1895.

WITNESSES:
Fred White
Thomas F. Wallace

INVENTOR:
Georg Krell,
By his Attorneys
Arthur O. Fraser & Co.

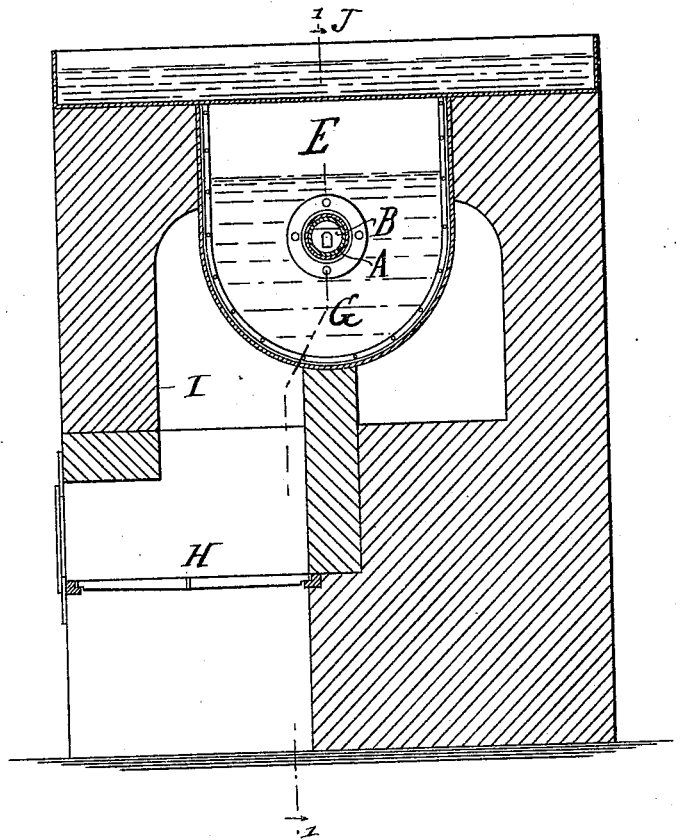

UNITED STATES PATENT OFFICE.

GEORG KRELL, OF HÜSTEN, GERMANY.

APPARATUS FOR CONCENTRATING AND DISTILLING SULFURIC ACID.

SPECIFICATION forming part of Letters Patent No. 549,138, dated November 5, 1895.

Application filed January 8, 1895. Serial No. 534,215. (No model.)

*To all whom it may concern:*

Be it known that I, GEORG KRELL, a subject of the German Emperor, and a resident of Hüsten, Westphalia, Germany, have invented certain new and useful Improvements in Apparatus for Concentrating and Distilling Sulfuric Acid and other Liquids of High Boiling-Point, of which the following is a specification.

This invention relates to apparatus for concentrating and distilling sulfuric acid and other liquids of high boiling-point, and aims to provide an improved apparatus for this purpose.

The platinum boilers largely employed for completing the concentration of sulfuric acid are usually fired by means of a simple grate-furnace placed underneath. Recently, however, instead of a grate-furnace a generator-furnace has been employed. In both cases the gases of combustion must have a very high temperature in order to be capable of imparting the necessary amount of heat for evaporation to the distilling-vessel and to liquids of high boiling-point, because the transfer of heat from gaseous bodies—heating gases—to metal takes place very slowly. The unavoidably great differences of temperature and the unequal distribution of heat caused thereby on the walls of the vessel have a very deleterious action not only on the vessel itself, but also on the liquid which is to be distilled, which by coming in contact with the highly overheated metal surfaces is more or less injuriously altered or decomposed.

It is well known that the platinum vessels employed for concentrating sulfuric acid are mainly attacked at those places where they are exposed to the most intense heat. The slightest neglect in looking after the platinum vessels, or a very small deposit of iron or lead salts or mechanical impurities on the bottom of the same, may at the very high temperature destroy the vessel in a very short time.

Sulfuric acid always undergoes during distillation a partial decomposition into anhydrid and water, which decomposition becomes greater the higher the degree of heat employed for the distillation. All other bodies of high boiling-point, more particularly those of organic origin, always undergo more or less decomposition or carbonization during the ordinary distillation in stills, according to the degree to which the walls of the vessel are overheated.

The drawbacks hereinbefore enumerated of the present method of treatment are avoided by the apparatus which forms the object of this specification.

Figure 1:
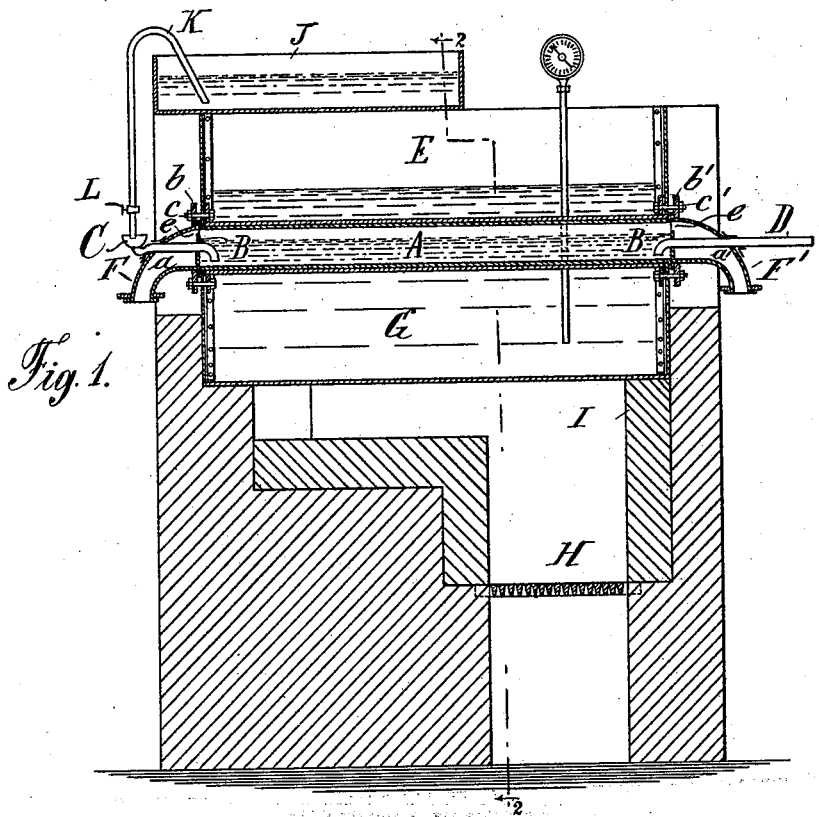
Figure 3:
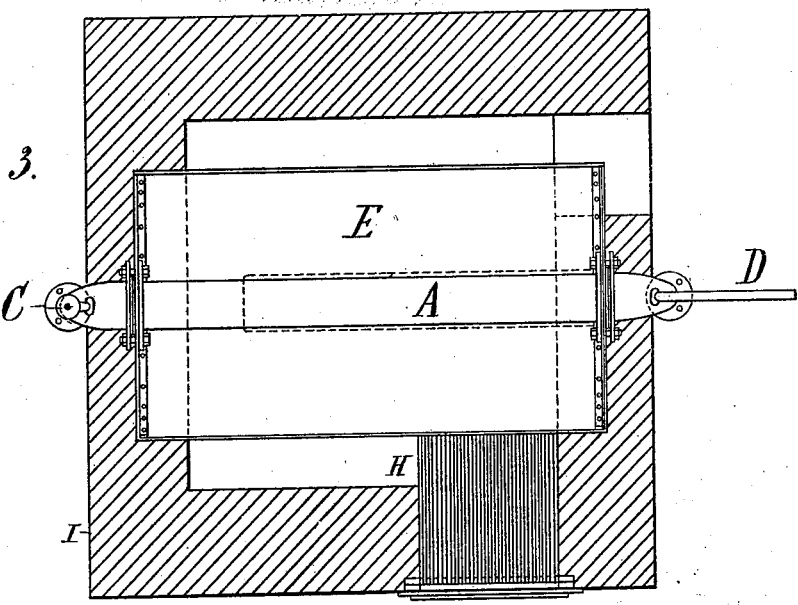

In the accompanying drawings, Figure 1 shows a vertical longitudinal section on the line 1 1 of the preferred form of my improved apparatus; Fig. 2, a vertical cross-section of the same, cut on the line 2 2; and Fig. 3 a plan view thereof.

Referring to the drawings, I will now describe the preferred form of my improvements.

A tube A, of platinum, gold, cast-iron, or even wrought-iron lined with platinum or gold, serves as the concentrating—that is to say, as the evaporating—vessel. The tube A is placed horizontally and is closed at both ends to about half its diameter by partitions B, made of the same kind of metal as the vessel itself, so that the tube, when in action, always remains half filled with sulfuric acid or other suitable high boiling-point liquid which is to be treated. Both ends of the tube or vessel A are connected by means of tubular outlet end pieces F and F', respectively, with an apparatus for condensing, cooling, and carrying off the evaporated products.

Warmed sulfuric acid or the like is continuously supplied at one end of the tube or vessel A by means of an inlet-funnel or feed-pipe C. At the other end of the tube or vessel A the undistilled part of its contents—that is to say, the concentrated sulfuric acid, or the part of the liquid treated which is of high boiling-point—is constantly carried away by means of a discharge or delivery pipe D. The pipes C and D are parallel with and enter about axially of the tube A, passing through the partitions B and having downwardly-bent ends which terminate near the lower side of the tube.

The evaporating or concentrating tube A is immersed in a suitable heat-conducting medium or liquid G—such as paraffin, a solution of salt, molten metal, or the like evenly heated to a suitably-high degree such liquid being contained in a suitably-heated vessel E inclosing the evaporating-tube A, which latter projects through the end walls of the same.

If the sulfuric acid or the like, which is to be concentrated be allowed to run into the vessel A, the apparatus delivers through the condensing apparatus placed at the inlet end piece F of the tube a very weak distilled acid, through the condensing apparatus placed at the exit end piece F' of the tube a stronger distilled acid, and by the discharge-pipe D acid concentrated to any desired degree, according as more or less acid is allowed to flow into the tube A. When treating other liquids of high boiling-point, the part which boils the most easily is distilled off at the first condensing apparatus, the liquid of higher boiling-point at the second condensing apparatus, and the remainder of the liquid, which is concentrated—that is to say, of high-boiling point—is discharged through the outlet-pipe D.

Owing to all the surfaces of the concentrating-vessel A being evenly heated by the latter being entirely immersed in a suitably-warmed medium or liquid, which rapidly conveys the necessary heat to the vessel, it is possible to obtain the evaporation with a minimum difference of temperature. By this means any overheating is avoided, the vessel is spared as much as possible, and the decomposition of the sulfuric acid or other liquid treated is reduced to a minimum. Further, by the rapid transfer of the heat of the bath of liquid to the metal of the vessel it is possible to utilize the fuel employed for heating the apparatus to its fullest extent.

The tube A may be of any suitable or known shape, but the cylindrical form shown is chosen because a tube cannot only be rotated, but also the rear end and the front end may be easily reversed, and thus an even wearing away of the metal may be obtained.

Any suitable source of heat may be employed in connection with my improved apparatus. I prefer to use a furnace H, into the walls I of which the vessel E is embedded in such manner that the heated gases traverse successively the side bottom walls of the vessel. The vessel E is preferably constructed with a semicylindrical bottom, upright side walls, and an open top, which is flush with the top of the walls I of the furnace. The heat medium G fills the bottom of the vessel to some distance above the evaporating-tube A. For warming the acid or other liquid to be fed to the tube I prefer to provide a pan or similar vessel J, which rests on top of the walls I and the vessel E and receives the heat rising from the latter. From the pan J a pipe K, controlled by a valve L, leads to the funnel-shaped end of the inlet-pipe C.

The end pieces F and F' of the evaporating or concentrating tube A are preferably formed separately therefrom, as walls on curved tubes $a$ $a'$, which are connected with the condensing apparatus. (Not represented.) These tubes have outer flanges at their inner ends which embrace the ends of the tube A and are clamped thereagainst by collars $b$ $b'$, which are drawn toward the tube A by bolts $c$ $c'$, engaging the end walls of the vessel E. Above the walls B are apertures or openings $e$ at the top of the tube A, giving communication from the latter to the end pieces F and F'.

It will be seen that my invention provides an improved apparatus for concentrating and distilling liquids of high boiling-point which can be variously and advantageously availed of; and it will be understood that the invention is not limited to the particular details of construction and arrangement set forth as constituting its preferred form, since it may be employed according to such modifications as circumstances or the judgment of those skilled in the art may dictate without departing from the spirit of my invention.

What I claim is—

1. In apparatus for concentrating sulphuric acid or other liquids of high boiling point, the combination with a heater, of a hollow heating vessel exposed to and heated by the heater and adapted to contain a heat conducting medium in its hollow interior, and a concentrating vessel within the hollow interior of said heating vessel, having a tubular portion disposed therein at such point that it is immersed in and covered on all sides by said heat conducting medium when the latter is in said heating vessel, and containing the liquid to be concentrated, whereby the heat from the heater can be transmitted to the concentrating vessel through a heat conducting medium, and therefore uniformity in the degree of heat applied can be obtained, substantially as and for the purpose set forth.

2. In apparatus for concentrating sulphuric acid or other liquids of high boiling point, a heater, in combination with a heating vessel exposed thereto and heated thereby and having a hollow interior adapted to contain a heat conducting medium, and a tubular concentrating vessel reversibly mounted in the hollow interior of said heating vessel, adapted to contain the substance to be treated, and disposed at such point in said heating vessel that it can be immersed in the heat conducting medium contained in the latter, whereby said vessel can be heated by said medium, and can be reversed in position to prevent impairment, substantially as and for the purpose set forth.

3. In apparatus for concentrating sulphuric acid or other liquids of high boiling point, a heater, in combination with a hollow heating vessel exposed thereto and heated thereby and adapted to contain in its interior a heat conducting medium, and a cylindrical tube rotatively mounted in the hollow interior of said heating vessel, constituting a concentrating vessel, disposed at such point within said heating vessel that it can be immersed in the medium contained therein, and heated by such medium, whereby said tube can be turned on its axis to present successive sides undermost.

4. In apparatus for concentrating sulphuric acid or other liquids of high boiling point, the combination with the furnace H, of a hollow heating vessel E exposed thereto and adapted to contain within it a heat conducting medium, a concentrating vessel A within the interior of said heating vessel, for containing the liquid to be treated, disposed therein at a point where it can be immersed in the medium contained thereby and heated by such medium, and having apertures at its ends, tubular outlet pieces F and F' at the ends of said concentrating vessel and conveying the products of distillation therefrom, a feed pipe leading to said concentrating vessel, and a discharge pipe leading therefrom, substantially as and for the purpose set forth.

In testimony whereof I have hereunto signed my name in the presence of two subscribing witnesses.

GEORG KRELL.

Witnesses:
FRITZ SCHRÖDER,
M. NAGEL.